May 17, 1938.    R. W. BARRETT    2,117,594
INSIDE CASING CUTTER
Filed June 15, 1936    2 Sheets-Sheet 1
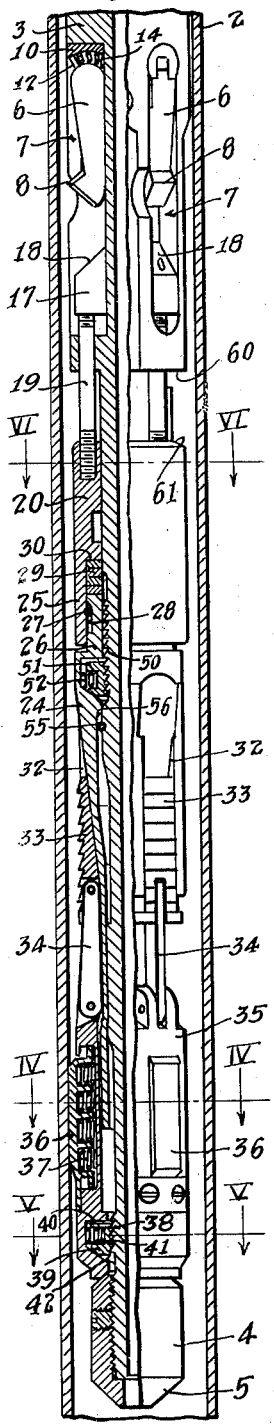
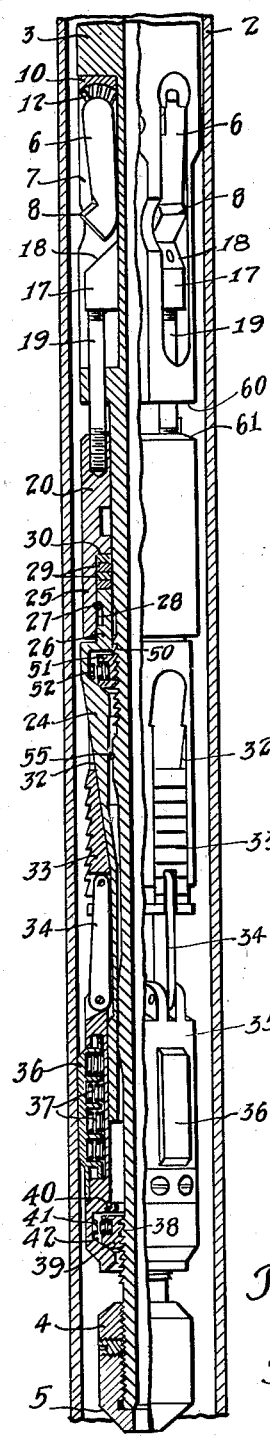
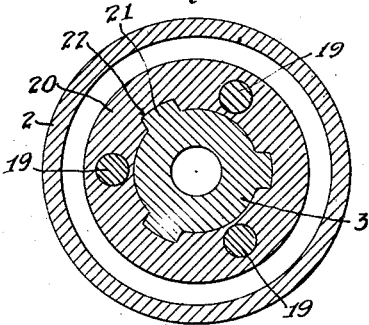
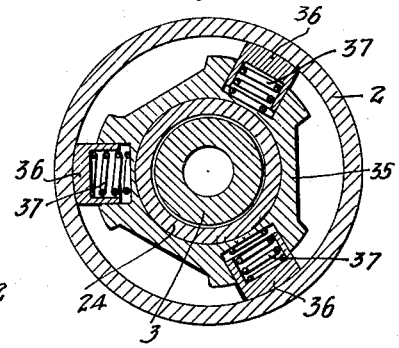
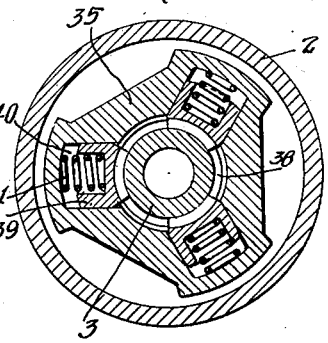
INVENTOR.
Ray W. Barrett
By Lyon & Lyon
ATTORNEYS May 17, 1938. R. W. BARRETT 2,117,594
INSIDE CASING CUTTER
Filed June 15, 1936 2 Sheets-Sheet 2
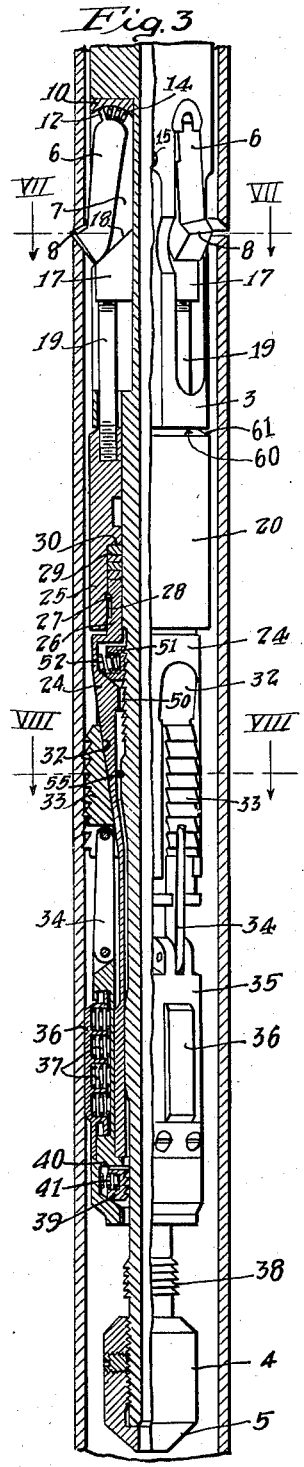
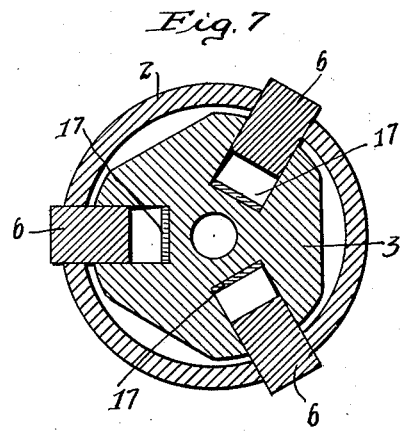
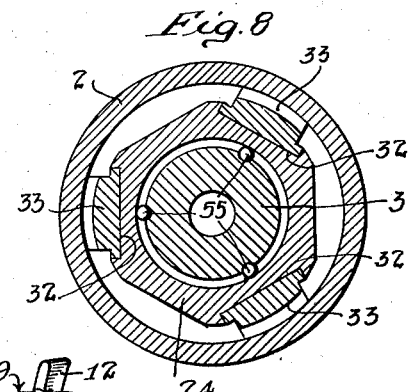
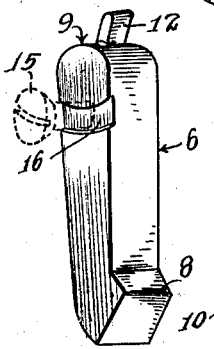
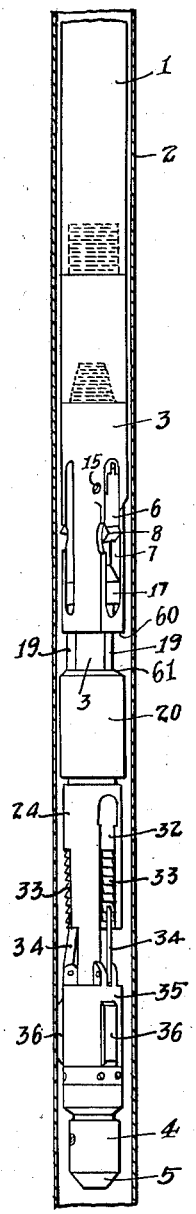
INVENTOR.
Ray W. Barrett
BY Lyon & Lyon
ATTORNEYS Patented May 17, 1938

2,117,594

UNITED STATES PATENT OFFICE 2,117,594

INSIDE CASING CUTTER

Ray W. Barrett, Huntington Beach, Calif., assignor to S. R. Bowen Co., Huntington Beach, Calif., a corporation of California Application June 15, 1936, Serial No. 85,202

11 Claims. (Cl. 164—0.7)

This invention relates to tools for cutting off, within a well, sections of pipe or casing located therein and has particular reference to the type of tool known in the industry as "casing cutters" and more particularly to that form of casing cutters known as "inside casing cutter".

A broad object of the invention is to increase the reliability and general effectiveness of casing cutters.

A more specific object of the present invention is to provide means for preventing the knives or cutting elements of casing cutters from being projected against the walls of the casing to be cut until after the tool has been securely anchored in place at the proper location at which the cut is to be made.

Another object of the invention is to provide a casing cutter which may be securely anchored in place within the casing and operated to expand the knives to perform a cutting operation and which at the completion of the cutting operation may be rapidly restored to its original condition, ready for the making of a successive cut.

Casing cutters as heretofore known in the industry have generally included a body member provided with knives, normally retracted out of possible engagement with the pipe or casing. The cutters are arranged to be expanded or extended into engagement with the pipe after the tool has been lowered to the desired cutting level by means of a cutter feeding mechanism, commonly arranged to feed the knives outwardly by a lowering movement of the body member relative to the feeding mechanism. To permit a mere lowering of the body member to cause the extension of the knives, the feeding mechanism is usually connected to a slip anchor construction which permits the feeding mechanism to be anchored in the casing at the desired level, such slip anchor mechanism usually including slips actuated by bow springs or other friction elements dragging on the pipe or casing while the tool is being lowered, the slips being held from engaging or gripping the casing until the desired level is reached by providing bayonet joint or other locking mechanism which is released by a slight rotation of the tool after it has been lowered to the desired level.

After the tool has been lowered to the selected cutting point, a slight rotation of the tubing string or drill string to which the tool is attached will release the slips, permitting the slip anchor mechanism to grip the casing and at the same time permit the feeding mechanism to start the expansion or extension of the cutters.

An essential difference between my construction and the previously known construction described is that I provide separate locks for the slip mechanism and for the knife-actuating mechanism so that it is possible to set the slips without actuating the knives and then later actuate the knives. This makes possible positive anchoring of the slips before there is any possibility of the knives being expanded.

The invention also incorporates various detailed improvements, all of which will become apparent from the following detailed description which refers to the drawings.

In the drawings:

Fig. 1 is a side elevation view, partly in section, of a casing cutter in accordance with the invention shown in full retracted position, i. e., with both the slips and knives retracted;

Fig. 2 is a view similar to Fig. 1 but with the slip lock released preliminary to setting the slips, the slips, however, being shown still in retracted position;

Fig. 3 is a view similar to Figs. 1 and 2 but showing the slips set and the knives fully expanded;

Fig. 4 is a cross section taken in the plane IV—IV of Fig. 1;

Fig. 5 is a cross section taken in the plane V—V of Fig. 1;

Fig. 6 is a cross section taken in the plane VI—VI of Fig. 1;

Fig. 7 is a cross section taken in the plane VII—VII of Fig. 3;

Fig. 8 is a cross section taken in the plane VIII—VIII of Fig. 3;

Fig. 9 is a perspective view of one of the knives employed;

Fig. 10 is a perspective view of the bearing member for one of the knives; and

Fig. 11 is a general elevational view of my casing cutter shown connected to a drill string in a casing.

Referring first to Fig. 11, I have shown a drill string 1 positioned within a casing 2 and having secured to its lower end a body member or mandrel 3 which extends from top to bottom of the casing cutter and terminates at the lower end in a tail nut 4 having beveled lower edges 5 to serve as a guide. The mandrel 3 is hollow and permits free passage of fluid therethrough although this is not material to the present invention.

Referring now to Fig. 1, the mandrel 3 has mounted therein adjacent the upper end three knives 6, each of which is positioned in a vertical slot 7 in the mandrel 3. The knives fit snugly between the side walls of the slot and are firmly supported thereby against the tangential forces applied thereto during a cutting operation, which is performed by swinging the lower ends of the knives outwardly against and through the casing by a mechanism to be described later. Each knife is therefore provided adjacent its lower edge with a cutting edge 8 and is supported against vertical movement at the upper end. Thus referring to Fig. 9, it will be observed that the upper end of each knife terminates in a cylindrical bearing surface 9 which seats in a semi-cylindrical bearing 10 in an insert 11 (Fig. 10) which is inserted in a recess provided therefor at the upper end of each slot 7 (Fig. 1). During a cutting operation substantial force is impressed downwardly upon each knife 6 by the body 3 and the bearing surfaces 9 and 10 on the knives 6 and the inserts 11, respectively, transmit this force. To urge the knives into retracted position, each knife is provided with a finger 12 extending outwardly from the bearing surface 9 thereon, which finger projects into an arcuate slot 13 in the associated insert 11 and a helical compression spring 14 (Fig. 1) is positioned in the slot back of the finger 12, thereby constantly urging the finger forwardly and urging the lower end of the knife inwardly into retracted position. To prevent the knives from dropping downwardly away from the bearing inserts 11, set screws 15 are provided in the mandrel 3, the inner end of each set screw projecting into an arcuate groove 16 in one side of each knife 6.

The knives are normally forced to assume the retracted position shown in Fig. 1 by the springs 14. When it is desired to cut a casing the knives are urged outwardly by feed blocks 17 which are mounted in the slots 7 below the knives 6 and have upper wedge ends adapted to be forced between the lower ends of the associated knives and the back walls of the slots 7. These feed blocks are all rigidly connected by studs 19 to a swivel case 20 which is a tubular member freely slidably mounted upon the mandrel 3, the latter being greatly reduced in diameter at this point. The swivel case, however, is restrained from rotary movement with respect to the mandrel by lands 21 (Fig. 6) on the mandrel which fit into grooves 22 in the swivel case 20.

It will be apparent that the feed blocks 17 will be moved in unison upwardly or downwardly in response to corresponding movement of the swivel case 20. To produce relative movement between the swivel case 20 and the mandrel 3, the swivel case is swivelly connected to a spear body 24 positioned therebelow, the spear body being freely rotatable on the mandrel.

To effect the swivel connection between the spear head 24 and the swivel case 20, the latter is counter-bored at the lower end to provide a skirt 25 which fits down over a reduced upper end portion 26 of the spear head and the two parts are interconnected against separating movement by a ring of balls 27 which are fitted half in a semi-circular groove in the skirt 25 and half in a rectangular groove 28 in the reduced portion 26 of the spear body. As shown in Fig. 1, the balls 27 are positioned closely adjacent the upper edge of the groove 28, thereby preventing further upward movement of the swivel case 20 with respect to the spear body 24. Downward movement of the swivel case 25 with respect to the spear body is prevented by a plurality of thrust washers 29 introduced between the upper end of the reduced portion 26 of the spear body and a shoulder 30 on the swivel case 20. These thrust washers 29 take a severe thrust during the operation of the device and in time they will wear considerably. In response to such wear, the swivel case can move down with respect to the spear body until the balls 27 reach the lower edge of the rectangular groove 28, after which the thrust washers 29 must be replaced.

The spear body 24 carries three slip seats 32, on each of which is mounted a slip 33, which may be of usual construction and, as shown in the drawings, are retained on their slip seats 32 by dove-tail bases which fit into grooves in the sides of the slip seats 32. Each slip 33 is connected by a slip link 34 to a spring case 35 which surrounds the lower portion of the mandrel and is freely slidable and rotatable thereon. This spring case 35 carries a plurality of friction shoes 36 which are urged radially outwardly by coil springs 37 positioned therebelow. In operation, these friction shoes 36 are at all times engaged against the casing and tend to resist motion through the casing.

It will be observed that because of the friction between the shoes 36 and the casing downward movement of the mandrel 3 would tend to cause the slips 33 to ride up on the spear body 24, thereby setting the slips against the casing. To prevent such movement, the mandrel is provided with screw threads 38 of ratchet type a short distance above the lower end, which screw threads are normally engaged by a plurality of spring nuts 39 mounted in recesses 40 in the spring case 35 below the shoes 36. Each spring nut 39 is constantly urged radially inwardly by a coil compression spring 41. The side and top walls of the recess 40 are vertical and horizontal, respectively, but the bottom wall 42 is inclined, as shown in Figs. 1, 2 and 3, so that although downward motion of the screw threads 38 with respect to the nuts 39 is resisted, upward movement of the screw threads with respect to the nuts can readily take place, the nuts moving upwardly and outwardly against the forces of the springs 41.

To retain the spear body 24 in lower position with the feed blocks 17 away from the knives 6, a second set of ratchet type screw threads 50 is provided on the mandrel 3, these threads 50 extending longitudinally a substantially greater distance along the mandrel than do the threads 38. Threads 50 cooperate with a series of spring-actuated nuts 51 mounted in recesses in the spear body 24 and urged radially inwardly by coil springs 52. The construction of the nuts 51 and springs 52 and their mounting in the recesses in the spear body 24 is substantially the same as in the case of the spring-actuated nuts 39. The threads 38 extend longitudinally of the mandrel substantially the length of the spring nuts 39 whereas the threads 50 extend longitudinally a distance substantially greater than the length of the nuts 51, the latter being comparable in length to the nuts 39. When the device is in normal position as shown in Fig. 1, the nuts 39 are substantially juxtaposed to the threads 38 and the nuts 51 are positioned at the lower end of the threads 50. In this condition the slips 33 are held in lowermost position on their seats 32 so that they cannot contact the casing and the spear body 24 is likewise held in lowermost position in which the feed blocks 17 are disposed a substantial distance below the knives 6.

It should be noted that in this position further downward movement of the spear body 24 with respect to the mandrel 3 is prevented by a ring of balls 55 fitted in a groove of semi-circular cross section in the mandrel 3 and bearing against a shoulder 56 on the spear body 24.

The device described is operated by first lowering it in the condition shown in Fig. 1 down through the casing 2 to the point where the casing is to be cut, the tool being lowered on a string of drill tubing. During its downward movement the friction shoes 36 bear against the casing and tend to urge the slips 33 upwardly along the spear body 24 but such movement is prevented by the spring nuts 39 engaging the threads 38.

When the point is reached where it is desired to cut the casing, the slips are released by rotating the drill tubing 1 to the right and lowering it simultaneously. This rotation tends to rotate the entire casing cutter but rotation of the spring case 35 is impeded by the friction between the shoes 36 and the casing so that the mandrel 3 rotates with respect to the spring case 35, thereby effecting rotation between the threads 38 and the nuts 39. The threads 38 are right-hand threads so that the relative rotation and lowering described eventually carries the threads 38 below the nuts 39 into the position shown in Fig. 2. The operator knows the vertical movement required to disengage the threads 38 from the nuts 39 and in practice he would rotate the drill rod ten to fifteen revolutions (while lowering it an inch or so) to insure disengagement of the nuts 39, after which he would lower the drill string without rotating it. Thereupon if the threads 38 have been disengaged from the nuts 39, the friction of the shoes 36 against the casing restrains the spring case 35 and the slips 33 from downward movement so that the downward movement of the mandrel is transmitted through the screws 50 and nuts 51 to the spear body 24, setting the slips 33 against the casing, and positively anchoring the spear head against further downward movement. If the operator has under-calculated the number of turns or the vertical movement necessary to disengage the threads 38, then the slips will not be set in response to the subsequent downward movement and the operator will rotate the string a few more turns (while lowering it) and then again lower the drill to set the slips.

When the slips 33 have been set the spear body 24 is firmly anchored in the casing against either further downward movement or rotation. But the mandrel is still supported against downward movement with respect to the spear body by the threads 50 thereon engaging the spring nuts 51 in the spear body, because despite the rotation of the mandrel to release the threads 38 from the nuts 39, the threads 50 will still be in engagement with the nuts 51 (as shown in Fig. 2) because of the relatively greater length of the screw threads 50. The weight of the tubing 1 above the mandrel 3, however, exerts a force urging the mandrel 3 downwardly so that the mandrel may move downwardly as fast, but no faster than is permitted by the screw 50 as the latter is rotated. Therefore, following the setting of the slips, the rotation of the drill string to the right is resumed with some weight on the mandrel, thereby slowly feeding the mandrel downwardly with respect to the spear body 24 as the threads 50 feed past the spring nuts 51. The swivel case 20 rotates with the mandrel by virtue of the lands 21 and the grooves 22 (Fig. 6) but is prevented from moving downwardly with the mandrel by the thrust washers 29 interposed between the shoulder 30 on the swivel case and the upper end of the spear body 24. Accordingly, the slow downward spiral movement of the mandrel upon which the knives 6 are mounted eventually carries the knives down onto the inclined wedge surfaces 18 of the feed blocks 17, after which further downward motion of the mandrel and knives gradually forces the latter out through the casing, cutting the latter off as shown in Fig. 3. Although the screw 50 and spring nuts 51 permit downward movement of the mandrel as the latter is rotated, they can not force such downward movement. Thus rotation of the mandrel to the right with the mandrel and spear head supported at a fixed level by external forces simply causes the nuts 51 to ride upwardly and outwardly and slip past the threads 50 on the mandrel. After the knives contact the casing, downward movement of the mandrel is also limited by the rate at which the knives cut through the casing and if, as is usually the case, such movement is slower than that permitted by the screw, then also the spring nuts 51 are deflected outwardly by the rotation of screw 50 to permit the ratchet threads on the nuts to slip past the ratchet threads on the nuts. Downward movement of the mandrel with respect to the spear head is finally terminated by engagement of a face 60 on the mandrel with a face 61 on the swivel case, by which time the knives are through the casing.

After the completion of a cut as described, the tool is restored to normal position by simply lifting up upon the drill pipe. This carries the mandrel upwardly with respect to the spring case 35 and the spear body 24. By virtue of the inclination of the threads on the screw 38 and nuts 39 and the screw 50 and nuts 51, the screws ratchet up past their associated spring nuts, meeting very little resistance but the springs being forced back into engagement with the threads by their springs 41 and 52, respectively, to prevent subsequent downward movement of the screws with respect to the nut sections except by rotation. By virtue of the downwardly and inwardly inclined bottom walls of the recesses containing the nuts 39 and 51, respectively, the ratchet action of the nuts is aided.

Continued upward motion of the mandrel first carries the balls 55 into engagement with the shoulder 56 on the spear body 24, thereafter carrying the latter upwardly, disengaging the slips 33 from the casing and permitting them to slide downwardly on their seats 32 into fully disengaged position, as shown in Fig. 1. When this position is reached, the upper end of the tail nut 4 on the mandrel is brought into engagement with the lower end of the spring case 35 so that the unit is completely restored to normal position as shown in Fig. 1 and further upward movement of the drill pipe carries the entire tool upwardly with it as a unit.

The casing cutter may thereupon be withdrawn completely from the casing or, if desired, it may be either raised or lowered to a new point in the casing and again anchored and the casing cut off by exactly the same procedure as that previously described.

It will be observed that by virtue of the fact that the slips 33 can be fully set by applying substantial weight to the spear body before the knives contact the casing, the possibility of the slips subsequently "creeping" during the cutting operation is greatly reduced. This is in marked contrast to usual construction in which the downward force to set the slips is applied to the spear body through the knives and feed blocks, thereby dividing the force applied to the casing between the knives and the slips, which sometimes breaks the knives and permits creeping of the slips.

It will also be observed that any number of cuts may be made since all that is necessary to reset the tool is to pull it upward. No operations involving rotating to the right or left are involved.

The studs 19 are preferably joined to the feed blocks 17 and the swivel case 20 by right hand and left hand threads, respectively, so that the knives can be adjusted vertically with respect to the swivel case by turning the studs 19 in and out. Such adjustment is desirable because it permits of adapting the knives for different size casing and also permits compensation for wear of the knives.

Although the invention has been explained by describing a specific embodiment thereof, it is to be understood that many detailed changes can be made in the specific construction shown without departing from the invention and the latter is therefore to be limited only as set forth in the appended claims.

I claim:

1. A casing cutter comprising a mandrel adapted to be raised, lowered and rotated within a casing on a drill string, a spear body slidably mounted on said mandrel, slips on said spear body, means also slidably mounted on said mandrel and connected to said slips for frictionally engaging a casing to actuate said slips, an outwardly expansible knife on said mandrel rotatable therewith, knife-expanding means for expanding said knife in response to downward movement of said mandrel with respect to said spear body, first locking means releasable in response to predetermined rotation in one direction of said mandrel with respect to said friction means for normally preventing downward movement of said mandrel with respect to said friction means and slips, and second locking means releasable in response to continued further rotation in excess of said predetermined rotation in said one direction of said mandrel with respect to said friction means for normally preventing downward movement of said mandrel with respect to said knife-expanding means.

2. A casing cutter comprising a mandrel adapted to be raised, lowered and rotated within a casing on a drill string, a spear body slidably mounted on said mandrel, slips on said spear body, means also slidably mounted on said mandrel and connected to said slips for frictionally engaging a casing to actuate said slips, an outwardly expansible knife on said mandrel rotatable therewith, knife-expanding means for expanding said knife in response to downward movement of said mandrel with respect to said spear body, a screw thread on said mandrel and a cooperating nut on said friction means for normally preventing downward movement of said mandrel with respect to said friction means while permitting downward movement of the mandrel in response to relative rotation of the mandrel with respect to the friction means to disengage said screw and nut, and a second screw on said mandrel and a cooperating nut on said spear body so spaced from the upper end of said second screw with respect to the spacing of the first mentioned nut from the upper end of its associated screw that downward rotation of the mandrel required to disengage said first mentioned screw and nut is less than that required to disengage said second mentioned screw and nut.

3. A casing cutter comprising a mandrel, a spear body slidably mounted thereon, slips on said spear body, friction means also slidably mounted on said mandrel and connected to said slips for frictionally engaging a casing to actuate said slips, an expansible knife on said mandrel, knife-expanding means for expanding said knife in response to downward movement between a predetermined limit of said mandrel with respect to said spear body, an upper screw on said mandrel and a cooperating nut on said spear body for limiting feeding action of said mandrel with respect to said spear body and knife-actuating means, in accordance with relative rotation between said mandrel and spear body, a lower shorter screw on said mandrel and a nut cooperating therewith on said friction means for normally retaining said mandrel against downward movement with respect to said friction means while permitting such downward movement in response to disengagement of said lower screw with respect to its cooperating nut.

4. A casing cutter as described in claim 2, in which the threads on said screws and nuts are ratchet threads and said nuts are split and urged against said screws by spring action whereby the screws engage the nuts in response to downward force on the mandrel and slip past the nuts in response to upward movement of the mandrel.

5. A casing cutter as described in claim 2, in which said locking means for normally preventing downward movement of said mandrel with respect to said friction means and slips comprises a screw on said mandrel having downwardly deflected ratchet threads and said friction means comprises a tubular member surrounding said screw having pockets in its inner surface, nut segments in said pockets having upwardly directed ratchet threads adapted to engage the threads on said mandrel, and spring means back of said nut segments urging them toward the mandrel, the lower wall of said pocket being inclined inwardly and downwardly.

6. In a casing cutter, a body member having longitudinal slots therein, knives in said slots, and means for pivotally mounting one end of each knife in the adjacent end of its associated slot, said knives having outwardly directed cutting edges adjacent their opposite ends, a tubular member slidably mounted on said body member spaced longitudinally from said knives adjacent the said opposite ends of the latter, arms extending from said tubular member into said slots, wedge heads on the ends of said arms adapted to enter between said knives and said body member to expand the knives, and means for moving said body member with respect to said tubular member to expand said knives, said arms comprising studs screwed into said tubular member and wedge heads respectively with oppositely directed screw threads whereby the distances between the wedge heads and the tubular member may be adjusted by rotating said studs.

7. A casing cutter comprising a mandrel adapted to be raised, lowered and rotated within a casing on a drill string, a spear body slidably mounted on said mandrel, slips on said spear body, means also slidably mounted on said mandrel and connected to said slips for frictionally engaging a casing to actuate said slips, an outwardly expansible knife on said mandrel rotatable therewith, knife-expanding means for expanding said knife in response to downward movement of said mandrel with respect to said spear body, first locking means releasable in response to predetermined rotation in one direction of said mandrel with respect to said friction means for normally preventing downward movement of said mandrel with respect to said friction means and slips, and second locking means releasable in response to continued further rotation in excess of said predetermined rotation in said one direction of said mandrel with respect to said friction means for normally preventing downward movement of said mandrel with respect to said knife-expanding means, and means for restoring said locking means into locking condition in response to straight upward movement of said mandrel with respect to said spear head and said slip-actuating means.

8. A casing cutter of the class described comprising a cylindrical body member having a vertical slot extending inwardly from its outer surface, with a knife pivotally supported at its upper end in the slot for swinging movement of the lower end of the knife into and out of the slot and means for swinging the knife out of the slot into engagement with a casing to be cut in which the upper end of the slot terminates in a recess wider than the remainder of the slot and having a cylindrical surface the axis of which extends radially with respect to the body member and the recess contains a bearing insert outwardly shaped to fit snugly therein and having a transverse cylindrical bearing surface in its under side, the upper end of the knife having a cooperating cylindrical bearing surface, and means for retaining said knife bearing surface adjacent said insert bearing surface.

9. A device as described in claim 8 in which said bearing insert has an arcuate slot in its cylindrical bearing surface, said knife has a finger on its bearing end projecting into said arcuate slot, and a helical compression spring is mounted in said arcuate slot back of said finger for retracting the lower end of said knife into said slot.

10. A casing cutter comprising a body member adapted to be moved within a casing on a drill string, an expansible knife on said body member, anchoring means movably connected to said body member and including expansible slips adapted to grip the casing, means for expanding said knife in response to downward movement of said body movement with respect to said anchoring means, means releasable by manipulation of said body member for retaining said slips in retracted condition, means also releasable by manipulation of said body member for preventing downward movement of said body member with respect to said anchoring means, said means for preventing downward movement of said body member being releasable only in response to further manipulation of said body member following the manipulation necessary to release said slip retaining means.

11. A casing cutter comprising a mandrel, a spear body slidably mounted thereon, slips on said spear body, friction means also slidably mounted on said mandrel and connected to said slips for frictionally engaging a casing to actuate said slips, an expansible knife on said mandrel, knife-expanding means for expanding said knife in response to downward movement between two predetermined positions of said mandrel with respect to said spear body, releasable locking means for normally retaining said mandrel above the upper of said two positions with respect to said spear body, releasable locking means for normally preventing downward movement of said mandrel with respect to said friction means and slips, both of said locking means being releasable in response to predetermined manipulation of said mandrel and said first locking means being inoperative to release said mandrel for movement downwardly between said two positions with respect to said spear body until after completion of the manipulation necessary to release said second locking means.

RAY W. BARRETT.